UNITED STATES PATENT OFFICE.

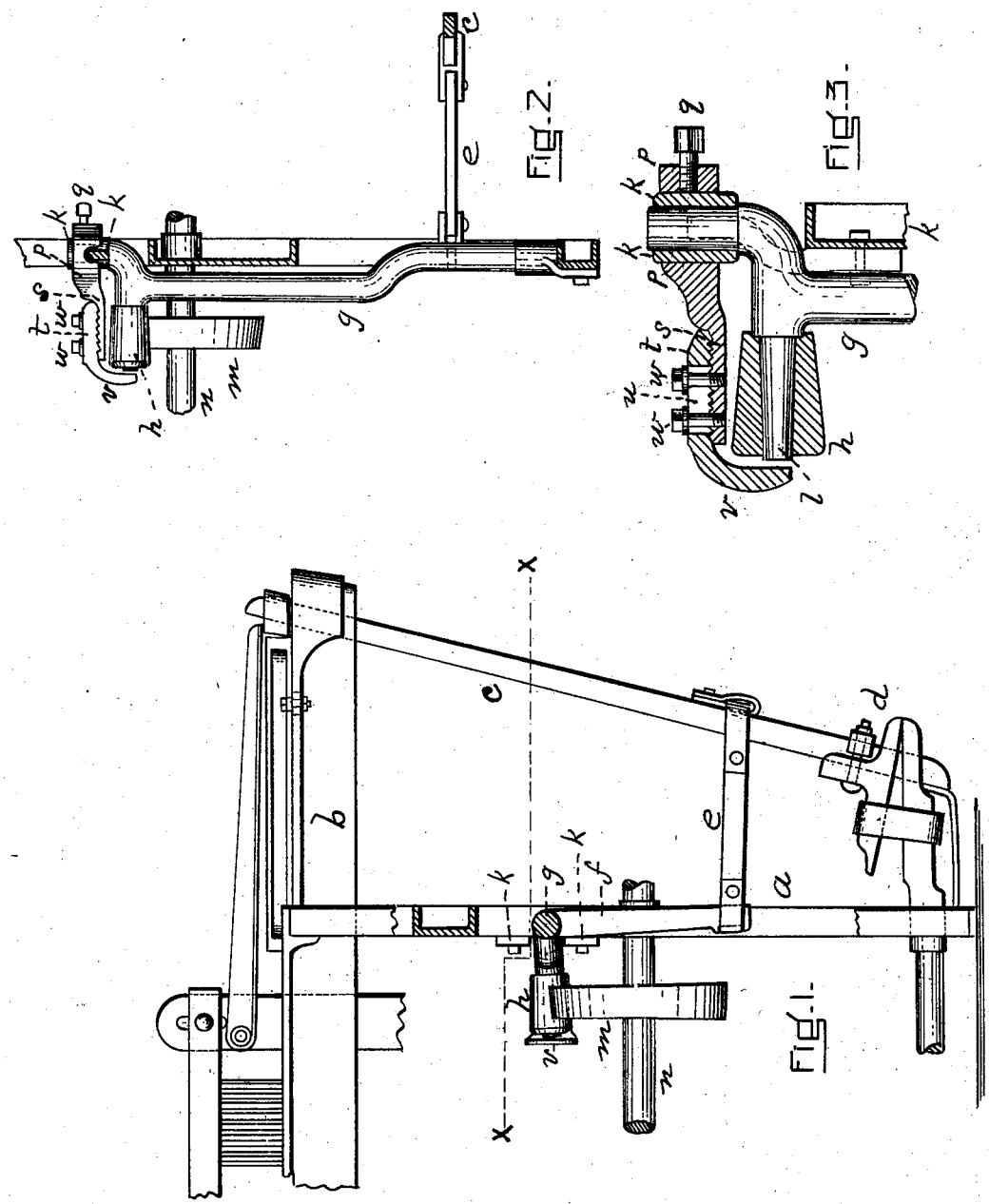

JOSEPH BLANCHETTE, OF SALEM, MASSACHUSETTS.

PICK-BALL HOLDER OR GUARD FOR LOOMS.

SPECIFICATION forming part of Letters Patent No. 720,316, dated February 10, 1903.

Application filed July 9, 1902. Serial No. 114,918. (No model.)

*To all whom it may concern:*

Be it known that I, JOSEPH BLANCHETTE, a citizen of the United States, residing in Salem, in the county of Essex and State of Massachusetts, have invented a new and useful Improvement in Pick-Ball Holders or Guards for Looms, of which the following is a specification.

This invention relates to the means for preventing the pick-ball from dropping or slipping off the stud. By the method now in common use the jar produced by the operation of the pick-cam tends to loosen or break the contrivance by which the ball is held on the stud. By my improvement I do away with a direct means of attachment and provide a guard or holder which serves to keep the ball from dropping or slipping off the stud and is not affected by the relative movement of the ball or by the jar produced by the pick-cam.

The nature of my invention is fully described in detail below and illustrated in the accompanying drawings, in which—

Figure 1 is a sectional elevation showing my invention or improvement and the parts of the loom which are directly connected therewith. Fig. 2 is a horizontal section taken on line X, Fig. 1. Fig. 3 is an enlarged detail in horizontal section.

Similar letters of reference indicate corresponding parts.

$a$ represents a portion of the frame of a loom, $b$ is the lay, $c$ is the picker-staff, $d$ is the rocker, $e$ is the strap which connects the picker-staff with the arm $f$, $g$ is the pick-shaft from which said arm extends, and $k$ is the pick-shaft stand, all constructed as usual.

$h$ is the pick-ball, supported by the stud $l$, and $m$ is the pick-cam on the cam-shaft $n$.

Instead of holding the pick-ball $h$ on the stud by means of a nut or similar direct contrivance I provide an adjustable stationary guard or holder, said guard or holder consisting of a bracket or arm whose shank or socket portion $p$ is secured by a suitable nut $q$ to and around the tubular portion of the pick-shaft stand $k$ and whose arm portion $s$ extends horizontally, as shown in Figs. 2 and 3, and has one surface serrated or toothed in order to adjustably support the holder or guard proper, which consists of the correspondingly serrated or toothed main portion $t$, slotted at $u$, and the hook portion $v$, which bends at substantially right angles with said main portion $t$, so that when the said guard $t\,v$ is secured to the arm $p\,s$ by means of suitable bolts $w$ said hook portion $v$ extends horizontally over or in front of the pick-ball $h$ and the end of the stud $l$ and out of contact with both, said hook portion being sufficiently broad, as shown in Fig. 1, to guard the pick-ball in the positions assumed during its vibration. By this means the swinging or vibrating pick-ball is held or guarded in position on the stud in such a manner that the means for thus holding or guarding the pick-ball is not liable to become loosened, injured, or broken by reason of the jar produced by the operation of the pick-cam. Preferably I make the two portions constituting the guard adjustable with relation to each other, as above described.

Having thus fully described my invention, what I claim, and desire to secure by Letters Patent, is—

In combination with the pick-shaft stand, the pick-ball and the stud supporting the same; the stationary pick-ball holder or guard comprising the main portion or shank $t$ and the hook portion $v$ extending horizontally over in front of the pick-ball independent of said pick-ball and stud; and means intermediate of the pick-ball holder and stand for securing said holder to the stand and retaining it rigidly in position with its shank at the side and its free end in front of the ball as the latter vibrates, for the purpose set forth.

In testimony whereof I have signed my name to this specification in the presence of two subscribing witnesses.

JOSEPH BLANCHETTE.

Witnesses:
 HENRY W. WILLIAMS,
 A. N. BONNEY.